United States Patent
Wakeford et al.

(10) Patent No.: US 10,265,628 B2
(45) Date of Patent: *Apr. 23, 2019

(54) SYSTEM AND METHOD FOR FACILITATING COMMUNICATION BETWEEN AFFILIATED PLAYERS IN AN ONLINE GAME VIA COMMUNICATION MEDIUMS EXTERNAL TO THE ONLINE GAME

(71) Applicant: Kabam, Inc., San Francisco, CA (US)

(72) Inventors: Kent Wakeford, San Francisco, CA (US); Clifford J. Harrington, San Francisco, CA (US)

(73) Assignee: Kabam, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/969,667

(22) Filed: May 2, 2018

(65) Prior Publication Data
US 2018/0243658 A1 Aug. 30, 2018

Related U.S. Application Data

(63) Continuation of application No. 15/815,198, filed on Nov. 16, 2017, now Pat. No. 9,968,858, which is a continuation of application No. 15/468,983, filed on Mar. 24, 2017, now Pat. No. 9,827,501, which is a continuation of application No. 15/166,249, filed on May 26, 2016, now Pat. No. 9,623,338, which is a continuation of application No. 13/895,450, filed on May 16, 2013, now Pat. No. 9,364,754.

(51) Int. Cl.
A63F 13/87 (2014.01)
A63F 13/35 (2014.01)
A63F 13/795 (2014.01)
A63F 13/537 (2014.01)

(52) U.S. Cl.
CPC .............. *A63F 13/87* (2014.09); *A63F 13/35* (2014.09); *A63F 13/537* (2014.09); *A63F 13/795* (2014.09)

(58) Field of Classification Search
USPC ..................................................... 463/20–42
See application file for complete search history.

(56) References Cited

U.S. PATENT DOCUMENTS

| | | | |
|---|---|---|---|
| 7,244,181 B2 * | 7/2007 | Wang et al. | 463/42 |
| 7,634,569 B2 | 12/2009 | VanAntwerp | |
| 8,271,365 B2 * | 9/2012 | Jung et al. | 705/35 |
| 2007/0033419 A1 * | 2/2007 | Kocher et al. | 713/193 |

(Continued)

*Primary Examiner* — Masud Ahmed
(74) *Attorney, Agent, or Firm* — Esplin & Associates, PC

(57) ABSTRACT

Affiliated players in an online game often coordinate activity and communication in the online game. Affiliated players may want to coordinate activities and/or communicate with each even when one or more affiliated players may not be logged into the online game. Further, persons of higher status in an affiliation may want to control the extent to which other players in the affiliation are sent messages external to the game. As such, one aspect of the disclosure relates to facilitating communication to a group of related players of an online game outside of communication mediums available via the game, where the ability to communicate and the type of communication may depend upon permissions associated with a player in a group of affiliated players.

20 Claims, 4 Drawing Sheets

| Communication Permission ID | Associated Statuses | External Communication Mediums |
|---|---|---|
| 1 | 1, 2 | Voicemail; Skype; Email; Text Message; SMS |
| 2 | 3 | Email; Text Message; SMS |
| 3 | 4, 5 | Email |

(56) References Cited

U.S. PATENT DOCUMENTS

| | | |
|---|---|---|
| 2010/0216553 A1 | 8/2010 | Chudley |
| 2011/0060821 A1* | 3/2011 | Loizeaux |
| 2013/0005476 A1* | 1/2013 | Keswani et al. ............... 463/42 |
| 2013/0053152 A1* | 2/2013 | Tabata ........................... 463/42 |
| 2014/0018156 A1 | 1/2014 | Rizzotti |

* cited by examiner

Fig. 2A

| Communication Permission ID | Associated Statuses | External Communication Mediums |
|---|---|---|
| 1 | 1, 2 | Voicemail; Skype; Email; Text Message; SMS |
| 2 | 3 | Email; Text Message; SMS |
| 3 | 4, 5 | Email |

Fig. 2B

| Communication Permission ID | Affiliation ID | Associated Statuses | External Communication Mediums |
|---|---|---|---|
| 1 | 1, 2 | 1, 2 | Voicemail; Skype; Email; Text Message; SMS |
| 2 | 4, 6, 7, 8 | 1, 2, 3 | Voicemail; Skype; Email; Text Message; SMS |
| 3 | 3, 5, 9 | 1 | Voicemail; Skype; Email; Text Message; SMS |
| 4 | 1, 2 | 3 | Email |
| 5 | 4, 6, 7, 8 | 4, 5 | Email; Text Message; SMS |
| 6 | 3, 5, 9 | 2 | Email; Text Message; SMS |
| 7 | 1, 2 | 4, 5 | Email |
| 8 | 4, 6, 7, 8 | 6 | Email |
| 9 | 3, 9 | 3, 4 | Text Message; SMS |

SYSTEM AND METHOD FOR FACILITATING COMMUNICATION BETWEEN AFFILIATED PLAYERS IN AN ONLINE GAME VIA COMMUNICATION MEDIUMS EXTERNAL TO THE ONLINE GAME

FIELD

The disclosure relates to facilitating communication to a group of related players of an online game outside of communication mediums available via the game, where the ability to communicate and the type of communication may depend upon permissions associated with a player in a group of affiliated players.

BACKGROUND

Various techniques for facilitating communication between players in an online game exist. Conventional gaming systems may facilitate off-line communicate between players based on in-game aliases and may provide private in-game communication channels for teams of players. Other conventional gaming systems may allow a user to control which users in a virtual world may see messages posted to an interactive space in the virtual world. Other conventional gaming systems may allow off-line communication between two players that are both participating in a game session. Conventional gaming systems may also describe determining the relative importance of a message to a user based on a relationship between the user and the sender of the message.

Conventional systems, however, suffer from various drawbacks and inefficiencies relating to facilitating communication to a group of related players of an online game outside of communication mediums available via the online game. For example, conventional gaming systems may fail to facilitate communication to a group of related players, where the ability to communicate and the type of communication may depend upon permissions associated with a player in the group of related players.

SUMMARY

Affiliated players in an online game often coordinate activity and communication in the online game. Affiliated players may want to coordinate activities and/or communicate with each even when one or more affiliated players may not be logged into the online game. Further, persons of higher status in an affiliation may want to control the extent to which other players in the affiliation are sent messages external to the game. As such, one aspect of the disclosure relates to facilitating communication to a group of related players of an online game outside of communication mediums available via the game, where the ability to communicate and the type of communication may depend upon permissions associated with a player in a group of affiliated players.

A system configured to facilitate communication to a group of related players of an online game outside of communication mediums available via the game may include one or more processors configured to execute compute program modules. The program modules may comprise a space module, a group module, a communications module, and/or other modules.

A space module may be configured to execute an instance of a virtual space in which an online game takes place, and to implement the instance of the virtual space to facilitate presentation of views of the virtual space to a player in an interface. The space module may be configured to facilitate interaction of the player with the virtual space by executing actions in the instance of the virtual space in response to commands input by the player through the interface.

A group module may be configured to manage one or more affiliations within the virtual space. An individual affiliation may comprise a discrete group of players with a relationship having a functional significance within the virtual space, where an individual player in the affiliation is associated with a respective status in the affiliation.

A communication module may be configured to receive a request from a player in a first affiliation to communicate to one or more other players in the first affiliation. The configuration module may be configured to determine whether to permit the communication based on a status associated with the player in the first affiliation. Responsive to a determination that the status associated with the player permits the player to communicate to the one or more other players in the first affiliation, the configuration module may be configured to send the communication to the one or more other players via a communication medium external to the online game A computer-implemented method of facilitating communication to related players of an online game via communication mediums external to the online game may be implemented in a computer system comprising one or more physical processors. The method may comprise: executing an instance of a virtual space; implementing the instance of the virtual space to facilitate participation by the one or more players in a game within the space by determining view information from the instance and transmitting the view information to one or more client computing platforms associated with the one or more players that facilitate presentation of views of the virtual space to the one or more players by the one or more client computing platforms; managing one or more affiliations within the virtual space, an individual affiliation comprising a discrete group of players with a relationship having a functional significance within the virtual space, wherein an individual player in the affiliation is associated with a respective status in the affiliation; receiving a request from a player in a first affiliation to communicate to one or more other players in the first affiliation; determining whether to permit the communication based on a status associated with the player in the first affiliation; and responsive to a determination that the status associated with the player permits the player to communicate to the one or more other players in the first affiliation, sending the communication to the one or more other players via a communication medium external to the online game.

A non-transitory electronic storage media may store information related to facilitating communication to related players of an online game via communication mediums external to the online game. The stored information may comprise a memory configured to store information related to an online game and instructions configured to cause a client computing platform to: execute an instance of a virtual space; implement the instance of the virtual space to facilitate participation by the one or more players in a game within the space by determining view information from the instance and transmitting the view information to one or more client computing platforms associated with the one or more players that facilitate presentation of views of the virtual space to the one or more players by the one or more client computing platforms; manage one or more affiliations within the virtual space, an individual affiliation comprising a discrete group of players with a relationship having a functional significance within the virtual space, wherein an individual player in the affiliation is associated with a respective status in the affiliation; receive a request from a player in a first affiliation to communicate to one or more other players in the first affiliation; determine whether to permit the communication based on a status associated with the player in the first affiliation; and responsive to a determination that the status associated with the player permits the player to communicate to the one or more other players in the first affiliation, send the communication to the one or more other players via a communication medium external to the online game.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates an exemplary table of a uniform set of communication permissions used for the online game, according to various aspects of the invention.

FIG. 2B illustrates an exemplary table of communication permissions per affiliation, according to various aspects of the invention.

DETAILED DESCRIPTION

Figure 1:
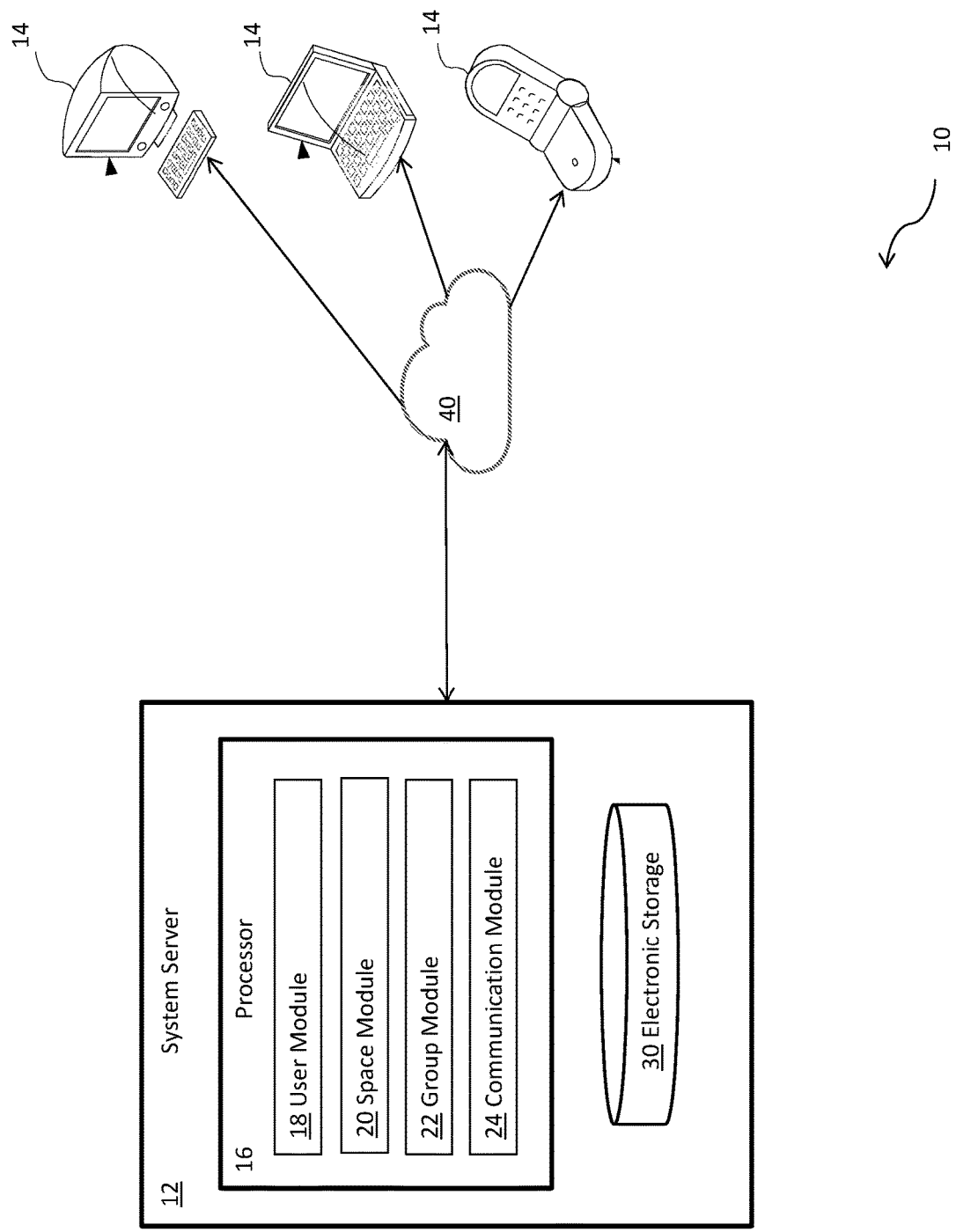
FIG. 1 illustrates a system configured to facilitate communication to related players of an online game outside of communication mediums available via the online game, according to various aspects of the invention.

FIG. 1 illustrates a system 10 configured to facilitate communication to a group of related players of an online game outside of communication mediums available via the game. In some implementations, system 10 may include a game server 12. The game server 12 may host a game space in which an online game takes place. The game server 12 may be configured to communicate with one or more client computing platforms 14 according to a client/server architecture. The users may access system 10 and/or the virtual space via client computing platforms 14.

The game server 12 may be configured to execute one or more computer program modules. The computer program modules may include one or more of a user module 18, a space module 20, a group module 22, a communication module 24, and/or other modules.

The user module 18 may be configured to access and/or manage one or more user profiles and/or user information associated with users of the system 10. The one or more user profiles and/or user information may include information stored by game server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), affiliation information (e.g., information related to one or more affiliations associated with the user), virtual space usage information, demographic information associated with users, interaction history among users in the virtual space, information stated by users, purchase information of users, information related to user-specified events (e.g., one or more conditions and/or game state information that may indicate an event specified by the user), browsing history of users, a client computing platform identification associated with a user, a phone number associated with a user, and/or other information related to users.

Space module 20 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space.

Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 20. Expressions of the instance executed on the clients may include space logic that effectively provides for execution of a limited version of the instance on a client that is synchronized and/or verified with state information received from space module 20. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 20 is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via respective client computing platforms 14. Communications may be routed to and from the appropriate users through game server 12 (e.g., through space module 20).

The group module 22 may be configured to establish and/or manage affiliations within individual virtual spaces. A given affiliation within a given virtual space may include a discrete group of users. For example, a first affiliation within a first virtual space may include a first user, a second user, and/or a discrete set of other users. Examples of an affiliation may include an alliance, a guild, a faction, a club, an association, a group, a crew, a band, a clan, a family, fellowship, a gang, a league, a partnership, a syndicate, a society, a tribe, a troop, a company, and/or other affiliations that include a discrete group of individuals.

The group module 22 may establish affiliations based on affiliation requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. According to some implementations, the group module 22 may establish affiliations intrinsically within the virtual space (e.g., faction-mates are formed based on avatar configuration), through recognized user behavior over time (e.g., raid members or player-versus-player partners), and/or other approaches for establishing affiliations.

Users belonging to an affiliation may have relationships with some or no functional significance, purpose, and/or impact within a given virtual space. Such relationships within the affiliation may include a leadership structure, a role structure, and/or other relationships within the affiliation. The functional significance of a relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as sharing and/or trading goods, services, player characters, and/or items in the virtual space; and/or other capabilities among users belonging to an affiliation.

The group module 22 may be configured to store information related to one or more affiliations. For example, for a first affiliation, the group module 22 may store information related to the discrete group of players of the first affiliation and information related to a set of statuses associated with the first affiliation. An individual player in the affiliation may be associated with one or more statuses in the affiliation. An individual status may represent a ranking, a position in a hierarchy, a group of available functions, a group of available abilities, and/or other characteristics related to a role in an affiliation.

The information related to the set of statuses for the first affiliation may be associated with a respective set of communication permissions. An individual communication permissions may indicate one or more of: one or more types of external communication mediums, one or more statuses, and/or other components related to external communication permissions. The one or more types of external communication mediums may indicate, for example, the types of external communication mediums via which a player may communicate to other players in the affiliation. The one or more statuses may comprise the statuses of players to whom a player with the individual communication permissions may provide external communications.

The communication module 24 may be configured to provide a communications interface for presentation to individual users. The communications interface may be presented to given user via a client computing platform 14 associated with that user. The communications interface may be configured to enable a given user to observe incoming communications and provide out-going communications. According to some implementations, the communications interface may be presented within a virtual space provided by game server 12. In some implementations, the communications interface may be presented outside of a virtual space. For example, the communications interface may be presented via a webpage that includes neither a virtual space nor a virtual environment. As another example, the communications interface may be provided via a mobile application on a mobile implementation of a client computing platform 14.

The communication module 24 may be configured to receive a request from a player in a first affiliation to communicate to one or more other players in the first affiliation. Based on a status associated with the player in the first affiliation, the communication module 24 may determine whether to permit the communication to occur. For example, based on a status associated with the player, the communication module 24 may access an associated communication permissions associated with that status in the first affiliation. The associated communication permissions may include information related to statuses of other players to whom the player may provide external communications.

In some implementations, the type of external communication medium by which the player in the first affiliation wants to communicate may also be compared with external communication medium types in the communication permissions. The types of external communication mediums associated with a communication permissions may include, for example, voicemail, skype communication, email, text message, SMS, FACETIME, and/or other types of external communication mediums. The types of external communication mediums are not limited to the examples described herein. In some implementations, the communication interface may facilitate communication via available external communication mediums in the online game.

In some implementations, a uniform set of communication permissions may be used for each affiliation. In some of these implementations, statuses used for affiliations may be the same or similar for each affiliation. An administrator and/or other game entity may update, add, revise, delete, and/or otherwise manage communication permissions for the game. One or more players in an affiliation may request the administrator and/or other game entity to update communication permissions associated with a specific status. The one or more players in the affiliation may have permissions that indicate that those players have the ability to make such a request.

FIG. 2A illustrates an exemplary table of a uniform set of communication permissions used for the online game, according to various aspects of the invention. The table may include a plurality of entries for a respective plurality of communication permissions. A communication permissions entry may comprise, for example, information related to an identification of a communication permissions, associated statuses with the communication permissions, external communication medium types associated with the communication permissions, and/or other attributes. As shown in the table of FIG. 2A, a status may be associated with only a single communication permissions. In some implementations, a status may be associated with multiple communication permissions.

In some implementations, one or more different communication permissions may be associated with each affiliation, with groups of affiliations, with affiliations associated with a specific virtual world, affiliations associated with a territory, affiliations associated with a shard, and/or other associated affiliations. An administrator, and/or one or more players of an affiliation may update, add, revise, delete, and/or otherwise manage communication permissions for the affiliation. For example, a status of a player in the affiliation may be used to determine whether the player has permission to manage communication permissions for the affiliation.

FIG. 2B illustrates an exemplary table of communication permissions per affiliation, according to various aspects of the invention. The table may include a plurality of entries for a respective plurality of communication permissions. A communication permissions entry may comprise, for example, information related to an identification of a communication permissions, information related to affiliations associated with the communication permissions, status of the affiliations that are associated with the communication permissions, external communication medium types associated with the communication permissions, and/or other attributes.

The associated statuses in FIGS. 2A and 2B may set forth individually. In some implementations, a plurality of groups of associated statuses may be stored, where each individual group may comprise a different set of associated statuses. The tables of communication permissions may reference a group of associated statuses instead of one or more individual associated statuses.

The types of external communication mediums in FIGS. 2A and 2B may set forth individually. In some implementations, a plurality of groups of types of external communication mediums may be stored, where each individual group may comprise a different set of types of external communication mediums. The tables of communication permissions may reference a group of external communication medium types instead of one or more individual types of external communication mediums.

The associated affiliations in FIG. 2B may set forth individually. In some implementations, a plurality of groups of associated affiliations may be stored, where each individual group may comprise a different set of associated affiliations. The tables of communication permissions may reference a group of associated affiliations instead of one or more individual associated affiliations.

For each type of group (e.g., groups of external communication medium types, associated statuses, associated affiliations, and/or other group types), an administrator and/or other game entity may manage the one or more types of groups. In some implementations, a player with a particular status in an affiliation (e.g., one or more players with highest statuses in the affiliation) may manage one or more types of groups.

Returning to FIG. 1, responsive to a determination that the one or more other players in the first affiliation to whom the player wants to communicate are associated with statuses included in the communication permissions for the player, the communication module 24 may permit the communication to occur. For example, the communication module 24 may access a table of communication permissions to determine whether to permit the communication to occur. The communication module 24 and/or the space module 20 may facilitate the performance of the communication.

The game server 12, client computing platforms 14, and/or external resources may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game servers 12, client computing platforms 14, and/or external resources may be operatively linked via some other communication media.

Game server 12 may include electronic storage 30, one or more processors 16, and/or other components. Game server 12 may include communication lines, or ports to enable the exchange of information with a network 50 and/or other computing platforms 14. Illustration of game server 12 in FIG. 1 is not intended to be limiting. Game server 12 may include a plurality of hardware, software, and/or firmware components operating together to provide the functionality attributed herein to game server 12. For example, game server 12 may be implemented by a cloud of computing platforms operating together as game server 12.

Electronic storage 30 may comprise non-transitory storage media that electronically stores information. The electronic storage media of electronic storage 30 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may include one or more virtual storage resources (e.g., cloud storage, a virtual private network, and/or other virtual storage resources). Electronic storage 30 may store software algorithms, information determined by processor 16, information received from game server 12, information received from client computing platforms 14, and/or other information that enables game server 12 to function as described herein.

Processor(s) 16 is configured to provide information processing capabilities in game server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22 and 24. Processor 16 may be configured to execute modules 18, 20, 22, and 24 by software; hardware; firmware; some combination of software, hardware, and/or firmware; and/or other mechanisms for configuring processing capabilities on processor 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, and 24 are illustrated in FIG. 1 as being implemented within a single processing unit, in implementations in which processor includes multiple processing units, one or more of modules 18, 20, 22, and 24 may be implemented remotely from the other modules. The description of the functionality provided by the different modules 18, 20, 22, and 24 described below is for illustrative purposes, and is not intended to be limiting, as any of modules 18, 20, 22, and 24 may provide more or less functionality than is described. For example, one or more of modules 18, 20, 22, and 24 may be eliminated, and some or all of its functionality may be provided by other ones of modules 18, 20, 22, and 24. As another example, processor 16 may be configured to execute one or more additional modules that may perform some or all of the functionality attributed below to one of modules 18, 20, 22, and 24.

A given client computing platform 14 may include one or more processors configured to execute computer program modules. The computer program modules may be configured to enable an expert or user associated with the given client computing platform 14 to interface with system 10, game server 12, and/or external resources, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Figure 3:
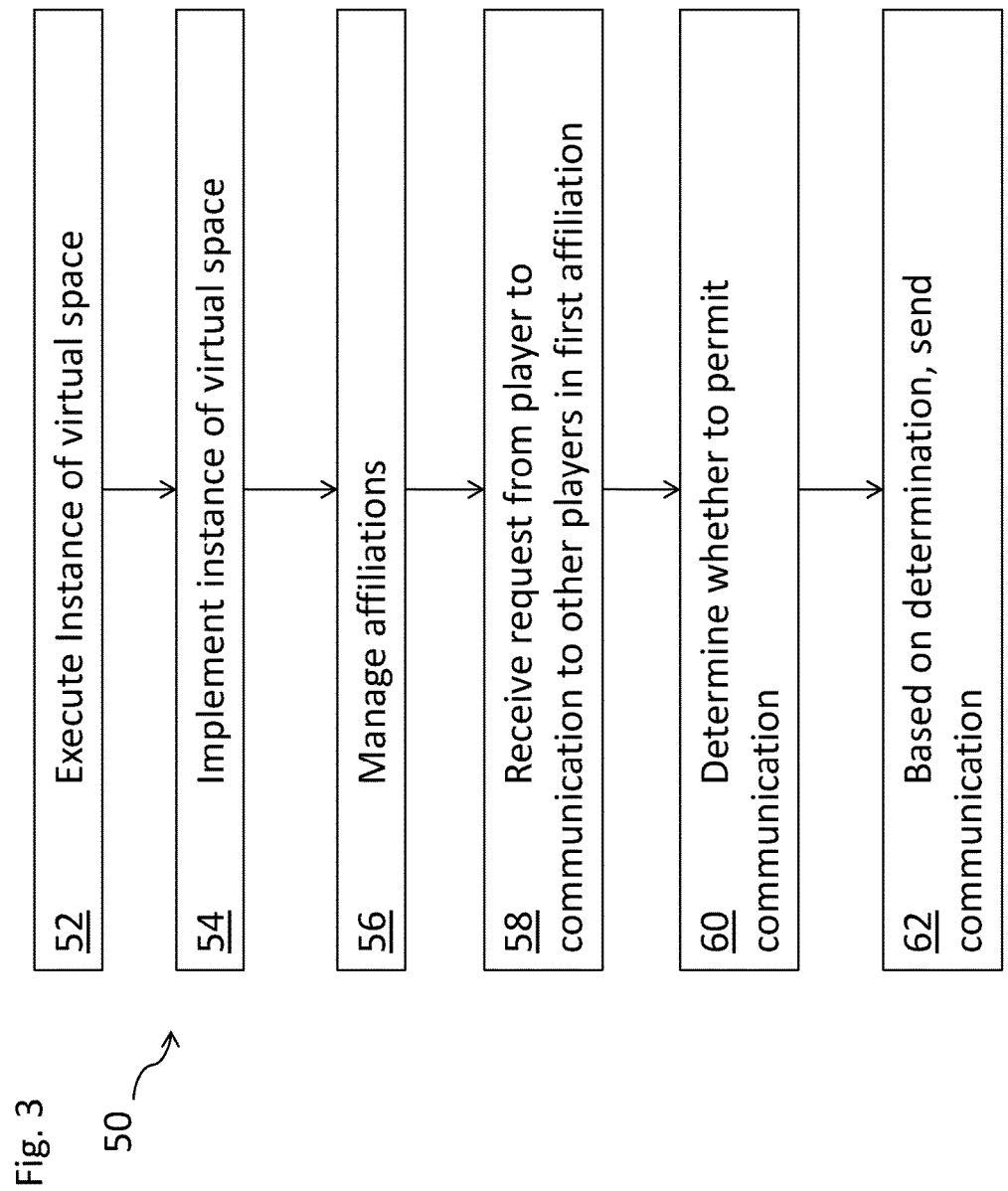
FIG. 3 illustrates an exemplary method of facilitating communication to related players of an online game outside of communication mediums available via the online game, according to various aspects of the invention.

FIG. 3 illustrates a method 50 of facilitating communication to related players of an online game via communication mediums external to the online game. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 34 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a space module the same as or similar to space module 20 (shown in FIG. 1 and described above).

At an operation 54, the executed instance of the virtual space may be implemented to determine view information. The view information may define views to be presented to users via client computing platforms. In some implementations, operation 54 may be performed by a space module the same as or similar to space module 20 (shown in FIG. 1 and described above).

At an operation 56, one or more affiliations within the virtual space may be managed. In some implementations, operation 56 may be performed by a user selection module the same as or similar to group module 22 (shown in FIG. 1 and described above).

At an operation 58, a request may be received from a first player in an affiliation to communicate to one or more other players in the first affiliation. In some implementations, operation 58 may be performed by a customer service module the same as or similar to communication module 24 (shown in FIG. 1 and described above).

At an operation 60, a determination may be made as to whether to permit the communication based on a status associated with the player in the first affiliation. In some implementations, operation 60 may be performed by a customer service module the same as or similar to communication module 24 (shown in FIG. 1 and described above).

At an operation 62, the communication may be sent to the one or more other players via a communication medium external to the online game, responsive to a determination that the status associated with the player permits the player to communicate to the one or more other players in the first affiliation. In some implementations, operation 62 may be performed by a customer service module the same as or similar to communication module 24 (shown in FIG. 1 and described above).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

The invention claimed is:

1. A system configured to facilitate communication between players in an affiliation within an online game, wherein the communication includes use of a communication medium external to the online game, wherein an instance of a virtual space in which the online game takes place is executed and implemented to transmit game state information over a network to a client computing platform associated with a player to facilitate presentation of views of the virtual space to the player, the system comprising:
   one or more processors configured by machine-readable instructions to:
   managing the affiliation within the online game, wherein the affiliation includes a group of players, wherein the player is included in the affiliation;
   receive a request from the player to initiate a communication to one or more other players in the affiliation, wherein the player is associated with communication permissions, and wherein the communication includes use of the communication medium that is external to the online game;
   make a determination whether to permit the communication, wherein the determination is based on the communication permissions associated with the player; and
   responsive to the determination to permit the communication being affirmative, initiate the communication to the one or more other players in the affiliation, wherein the communication includes use of the communication medium that is external to the online game.

2. The system of claim 1, wherein the affiliation includes relationships that have functional significance within the online game.

3. The system of claim 1, wherein the request defines a type of communication medium external to the online game.

4. The system of claim 1, wherein the communication medium comprises one or more of voicemail, email, text message, sms, and/or social media post.

5. The system of claim 1, wherein the one or more processors are configured by machine-readable instructions to:
   store a set of communication permissions associated with a set of statuses, wherein the set of statuses is associated with the players included in the affiliation, wherein individual communication permissions are based on associated statuses from the set of statuses.

6. The system of claim 5, wherein the one or more processors are configured by machine-readable instructions to make the determination whether to permit the communication based on the communication permissions associated with the player to the one or more other players in the affiliation by:
   determining whether one or more statuses from the set of statuses that are associated with the player indicate permission to initiate the communication.

7. The system of claim 1, wherein the communication uses a particular type of communication medium, wherein the one or more processors are configured by machine-readable instructions to make the determination whether to permit the communication based on the communication permissions associated with the player to the one or more other players in the first affiliation by:
   determining whether the communication permissions associated with the player indicate the particular type of communication medium.

8. The system of claim 1, wherein the one or more processors are configured by machine-readable instructions to:
   responsive to the determination that the communication permissions associated with the player do not permit the player to communicate to the one or more other players in the first affiliation, notify the player that the communication is not permitted.

9. The system of claim 8, wherein the one or more processors are configured by machine-readable instructions to:
   responsive to a determination that the player would like to request a second player to communicate to the one or more other players in the affiliation, send a request to the second player to perform the communication.

10. The system of claim 1, wherein the request from the player is received through a communications interface that is presented within the online game to the player.

11. The system of claim 1, wherein the request from the player is received through a communications interface that is presented through a mobile application to the player.

12. The system of claim 1, wherein the request from the player is received through a communications interface that is presented outside of the virtual space.

13. A computer-implemented method of facilitating communication between players in an affiliation within an online game, wherein the communication includes use of a communication medium external to the online game, wherein an instance of a virtual space in which the online game takes place is executed and implemented to transmit game state information over a network to a client computing platform associated with a player to facilitate presentation of views of the virtual space to the player, the method being implemented in a computer system comprising one or more physical processors, the method comprising:
   managing the affiliation within the online game, wherein the affiliation includes a group of players, wherein the player is included in the affiliation;
   receiving a request from the player to initiate a communication to one or more other players in the affiliation, wherein the player is associated with communication permissions, wherein the communication includes use of the communication medium that is external to the online game;

making a determination whether to permit the communication, wherein the determination is based on the communication permissions associated with the player in the affiliation; and responsive to the determination to permit the communication being affirmative, initiate the communication to the one or more other players in the affiliation, wherein the communication includes use of the communication medium that is external to the online game.

14. The method of claim 13, wherein the affiliation includes relationships that have functional significance within the online game.

15. The method of claim 13, wherein the request comprises a type of communication medium external to the online game.

16. The method of claim 13, further comprising:
storing a set of communication permissions associated with a set of statuses, wherein the set of statuses is associated with the players included in the affiliation, wherein individual communication permissions are based on associated statuses from the set of statuses.

17. The method of claim 16, wherein the determination whether to permit the communication based on the communication permissions associated with the player to the one or more other players in the affiliation includes:
determining whether one or more statuses from the set of statuses that are associated with the player indicate permission to initiate the communication.

18. The method of claim 13, wherein the communication uses a particular type of communication medium, wherein the determination whether to permit the communication based on the communication permissions associated with the player to the one or more other players in the affiliation includes:
determining whether the communication permissions associated with the player indicate the particular type of communication medium.

19. The method of claim 13, further comprising:
responsive to the determination that the communication permissions associated with the player do not permit the player to communicate to the one or more other players in the affiliation, notifying the player that the communication is not permitted.

20. The method of claim 19, further comprising:
responsive to a determination that the player would like to request a second player to communicate to the one or more other players in the affiliation, sending a request to the second player to perform the communication.

* * * * *